(12) United States Patent
Tan

(10) Patent No.: US 7,104,942 B2
(45) Date of Patent: Sep. 12, 2006

(54) SIDE SEAMED PLASTIC PRODUCE BAG, METHOD OF MAKING AND DISPENSER FOR SAME

(76) Inventor: Greg Tan, 5821 Citrus Blvd., Suite B, Harahan, LA (US) 70123

( * ) Notice: Subject to any disclaimer, the term of this patent is extended or adjusted under 35 U.S.C. 154(b) by 428 days.

(21) Appl. No.: 10/443,998

(22) Filed: May 21, 2003

(65) Prior Publication Data
US 2004/0245270 A1 Dec. 9, 2004

(51) Int. Cl.
B31B 1/64 (2006.01)

(52) U.S. Cl. ............... 493/194; 493/199; 493/186

(58) Field of Classification Search ........ 493/186–189, 493/194, 195, 199, 203
See application file for complete search history.

(56) References Cited

U.S. PATENT DOCUMENTS

| | | | |
|---|---|---|---|
| 1,702,115 A * | 2/1929 | Irving ................... | 493/188 |
| 2,444,685 A | 7/1948 | Waters | |
| 2,824,685 A * | 2/1958 | Patton ................... | 229/69 |
| 3,115,295 A | 12/1963 | Nash | |
| 3,308,722 A * | 3/1967 | Peterson ................ | 493/187 |
| 3,355,996 A * | 12/1967 | Medleycott et al. .... | 493/194 |
| 3,372,625 A * | 3/1968 | Simecek et al. ........ | 156/251 |
| 3,448,915 A | 6/1969 | Schwarzkopf | |
| 3,469,769 A | 9/1969 | Guenther | |
| 3,512,456 A * | 5/1970 | Meyer ................... | 493/194 |
| 3,534,666 A * | 10/1970 | Maccherone ........... | 493/194 |
| 3,537,360 A * | 11/1970 | Farnam ................. | 493/187 |
| 3,605,571 A | 9/1971 | Titchenal | |
| 3,749,237 A | 7/1973 | Dorton | |
| 3,931,886 A | 1/1976 | Yamauchi | |
| 4,031,818 A * | 6/1977 | Kehoe ................... | 493/1 |
| 4,164,170 A | 8/1979 | Nordin | |
| 4,363,437 A | 12/1982 | Scherz | |
| 4,811,418 A | 3/1989 | Reifenhauser | |
| 4,849,040 A * | 7/1989 | Wood ................... | 156/204 |
| 4,892,512 A * | 1/1990 | Branson ................ | 493/194 |
| 4,925,438 A * | 5/1990 | Wagner ................. | 493/194 |
| 4,929,224 A * | 5/1990 | Hanson et al. ......... | 493/194 |
| 5,237,799 A * | 8/1993 | van Boxtel ............ | 53/426 |
| 5,246,110 A * | 9/1993 | Greyvenstein .......... | 206/390 |
| 5,611,627 A | 3/1997 | Belias et al. | |
| 5,941,393 A | 8/1999 | Wilfong, Jr. | |
| 5,967,663 A | 10/1999 | Vaquero et al. | |
| 6,811,527 B1 * | 11/2004 | Andersson et al. ..... | 493/187 |

* cited by examiner

Primary Examiner—Sameh H. Tawfik
(74) Attorney, Agent, or Firm—David A. Belasco; Belasco Jacobs & Townsley, LLP

(57) ABSTRACT

A side seamed plastic produce bag includes a front wall and a taller back wall, first and second side edges sealed together and a seamless bag bottom. The taller back wall provides means for finding the bag opening. The bag is joined at the side edges to additional bags by a perforation. The bag is corona treated on at least one of the front and back walls and advertising or promotional material is printed on the corona treated surface. The invention includes means for manufacturing the bags and winding them onto cores or forming the bags into coreless rolls. Dispensers are provided for both the cored and coreless rolls. The dispensers include a vertical container with an open top that is mounted on a planar base. The container includes a vertical slit for dispensing the bags. The dispenser for cored rolls includes a vertical rod on which the core revolves.

10 Claims, 7 Drawing Sheets

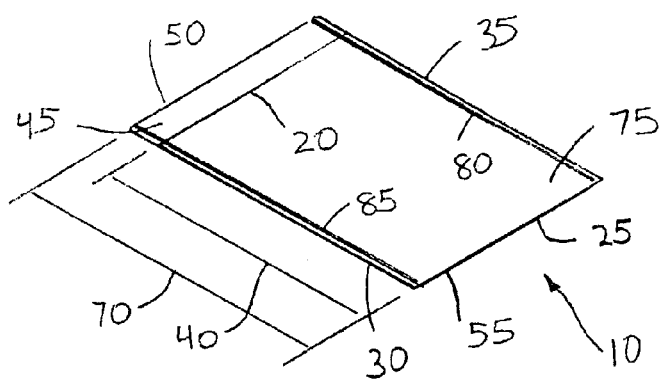
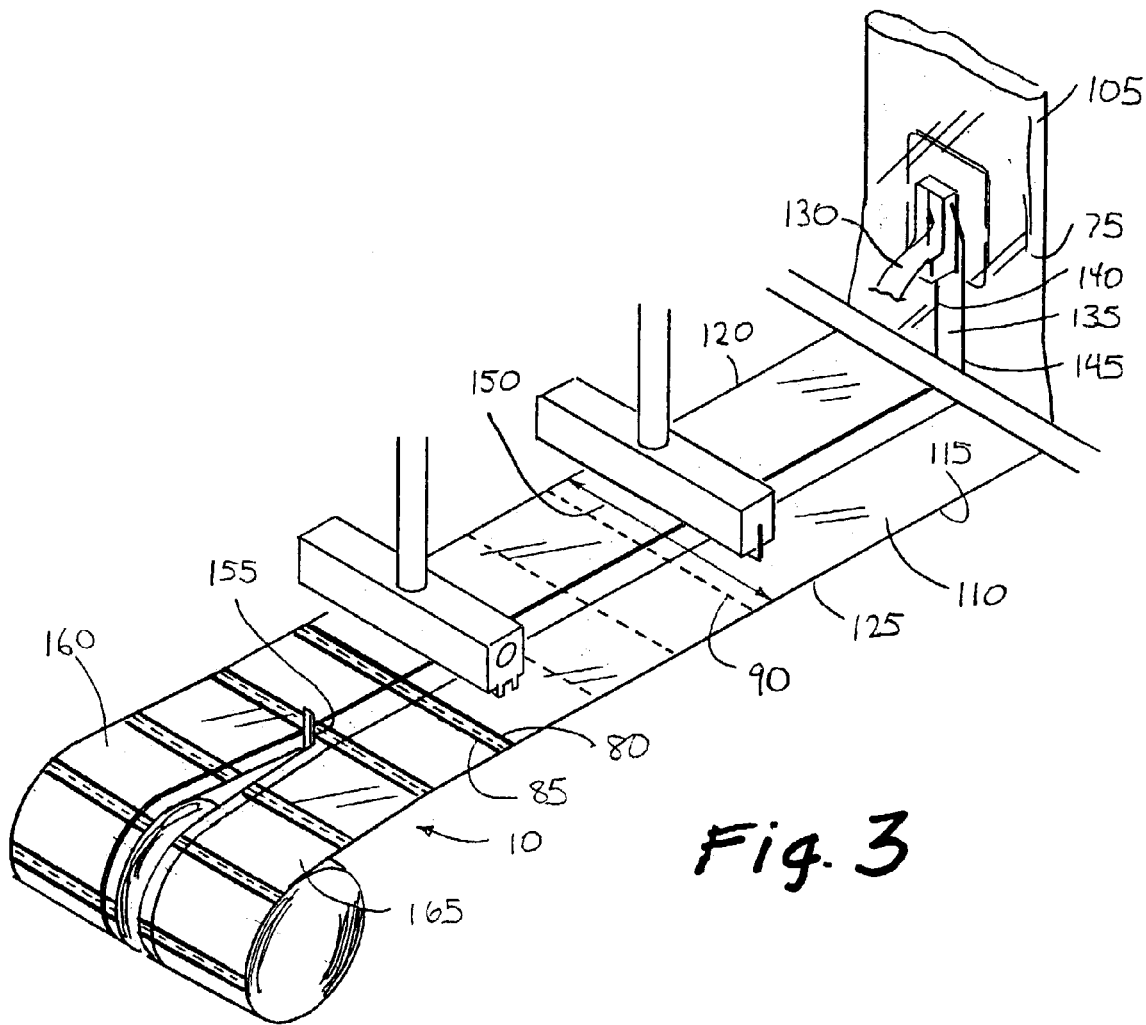

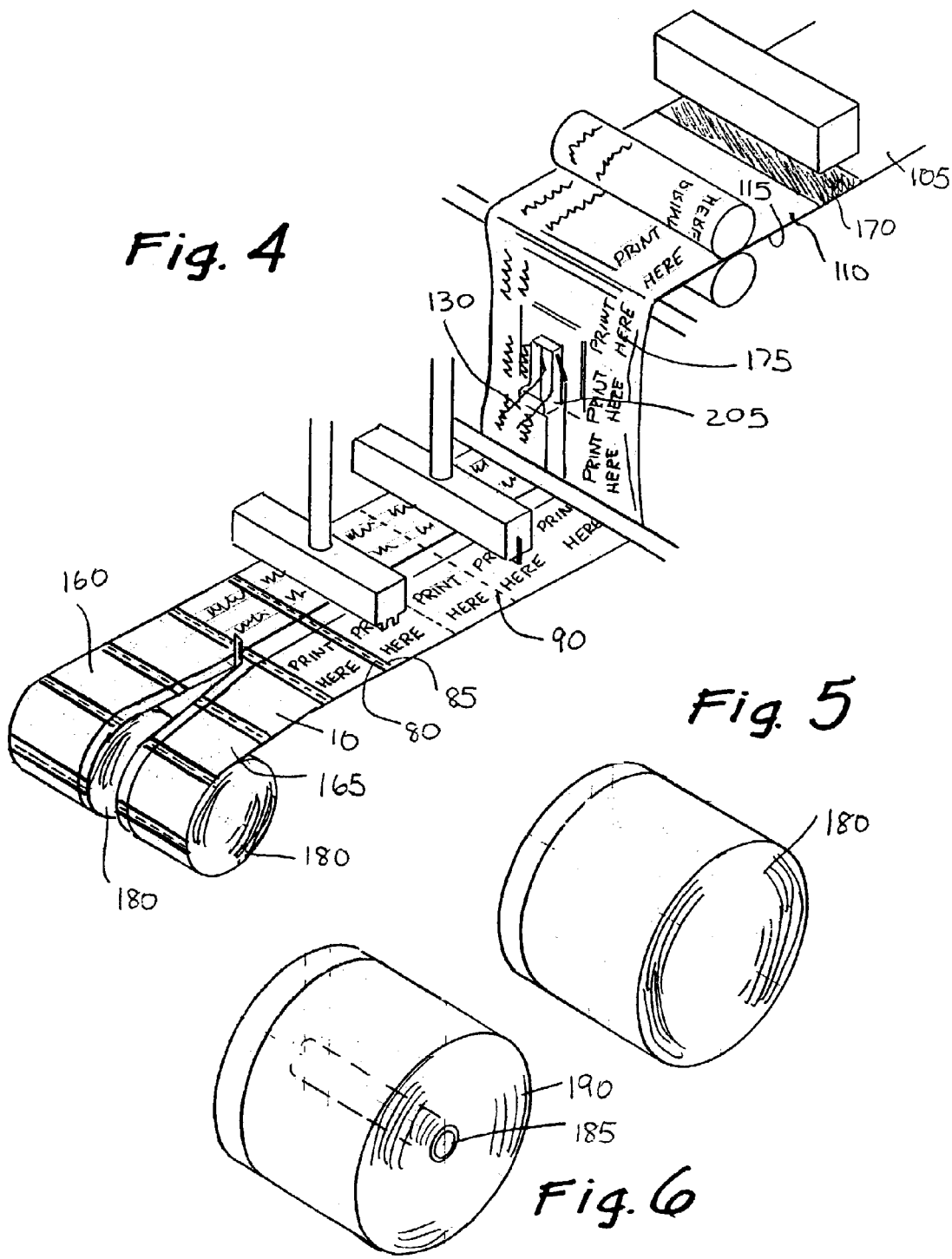

SIDE SEAMED PLASTIC PRODUCE BAG, METHOD OF MAKING AND DISPENSER FOR SAME

FIELD OF INVENTION

The invention pertains to plastic film produce bags. More particularly, the invention relates to plastic produce bags having no bottom seam, thus providing for increased resistance to rupturing, and to methods for making and dispensing the bags.

BACKGROUND OF THE INVENTION

Various designs have been developed for plastic produce bags as well as for methods for making and dispensing the bags.

U.S. Pat. No. 5,611,627 issued to Belias et al. is directed to an easy open thermoplastic bag. The bag is manufactured from a flattened tube of thermoplastic material with transverse heat seals. The transverse heat seals along with the sinusoidally oscillating paths form the tube into two halves or bags. The result of the transverse heat-seals and the cutting paths, is that two bags are formed with seamless bottoms. The sinusoidal cuts in the front and back portions of the tube respectively give rise to a mouth or opening for the bags with tabs that allow for the bags to be more easily opened.

U.S. Pat. No. 4,164,170 issued to Nordin, discloses a method of making bags. The patent describes the manufacturing of a string of bags from a hose-like blank. Since a hose-like blank is used, the bottoms of the resultant bags are continuous in nature and the sides of a bag are formed by welds with separation lines in order to separate one set of bags from another. The hose-like blank is cut into two substantially equal parts along a center line while the cutting lines are offset to form the handles of the finished bag.

U.S. Pat. No. 4,811,418, issued to Reifenhauser is directed to a method for the manufacture of plastic bags with welded side seams. The patent describes the production of two bags side-by-side in parallel from tubular film that is fed in a first direction. The tubular film is cut in a sinusoidal configuration in the center of the film, thus forming two semitubes to form two side seam bags with welded side seams and handle opening portions.

U.S. Pat. No. 2,444,685 issued to Waters is directed to the multiple fabrication method and apparatus for forming liquid-type envelope bags. A supply roll of material with defined edges is passed through feed rolls and around a former plate in order to bring the edges together along a line with a defined space between them. The edges ultimately form the opening of the envelope after having been cut by a cutter into separate envelopes. A pair of transverse welds are formed in the process and the paired envelopes are cut by means of cross-cut knife.

U.S. Pat. No. 5,967,663 issued to Vaquero et al. is directed to a thermoplastic bag structure. The thermoplastic tube is cut into two portions by means of cutting instruments that form sinusoidal paths and hence sinusoidal cuts. Transverse heat seals and transverse perforations separate the tube into pairs of bags such that the folded bottom edge does not require heat sealing and the openings of the resultant bags have "tabs" so that they may be more easily opened.

While other variations exist, the above-described designs for plastic produce bags are typical of those encountered in the prior art. It is an objective of the present invention to provide a produce bag without a bottom seam for additional strength in the bag bottom. It is a further objective to provide a produce bag that provides means to easily identify and open the bag. It is a still further objective of the invention to provide the above-described capabilities in a produce bag that can be easily dispensed from a roll using a compact and inexpensive dispenser. It is yet a further objective to provide a means to manufacture such produce bags using economical and reliable high-speed methods. While some of the objectives of the present invention are disclosed in the prior art, none of the inventions found include all of the requirements identified.

SUMMARY OF THE INVENTION

The present invention addresses all of the deficiencies of side-seamed plastic produce bag inventions and satisfies all of the objectives described above.

(1) A side-seamed plastic produce bag providing the desired features may be constructed from the following components. A front wall is provided. The front wall has a top edge, a bottom edge, a first side edge, a second side edge and a first predetermined height. A back wall is provided. The back wall has an upper edge, a lower edge, a first side edge, a second side edge and a second predetermined height greater than the first predetermined height. The front wall and the back wall are formed from a single piece of plastic film such that the bottom edge of the front wall is joined seamlessly with the lower edge of the back wall.

The first side edge of the front wall is attached to the first side edge of the back wall at a first side seam. The second side edge of the front wall is attached to the second side edge of the back wall at a second side seam. A perforation is provided. The perforation is spaced from the second side seam and extends from the upper edge of the back wall to the lower edge of the back wall. The perforation joins the bag to a subsequent bag. When separated from the subsequent bag, the bag will have a back wall of greater height than the front wall, thereby providing a means for locating an opening of the bag.

(2) A method of making side-seamed plastic produce bags, comprises the steps of: extruding a continuous tube of plastic film and flattening the tube. The tube has an upper surface, a lower surface, first and second side edges. Slitting the upper surface to remove a strip of plastic material to form a slit. The slit has a first side and a second side. The first and second sides are parallel to the first and second side edges of the tube. Removing the strip. Forming a perforation perpendicular to the first and second side edges across an entire width of the tube. Sealing the tube at a first side seam. The first side seam is spaced from and parallel to the perforation. Sealing the tube at a second side seam. The second side seam is spaced from and parallel to the first side seam. Cutting the lower surface at a point below and between the first and second sides of the slit in the upper surface to form two facing bag streams.

(3) In a variant of the method of making side-seamed plastic produce bags, the method includes the further step of corona treating at least one of the upper surface and the lower surface of the flattened tube prior to slitting the upper surface to remove the strip of plastic material.

(4) In a further variant of the method, the method includes the further step of printing advertising or informational material on at least one of the corona treated surfaces of the flattened tube.

(5) In still a further variant of the method, the method includes the further step of rolling each of the bag streams to form a bag roll.

(6) In yet a further variant of the method, the method includes the further step of rolling each of the bag streams about a cylindrical core to form a bag roll.

(7) In another variant of the method of making side-seamed plastic produce bags, the method includes the steps of: Extruding a continuous tube of plastic film and flattening the tube. The tube has an upper surface, a lower surface, first and second side edges. Winding the flattened tube onto a core. Moving the core to a cutting machine. The cutting machine includes a slitter. Feeding the tube from the core into the cutting machine. Slitting the upper surface to remove a strip of plastic material to for a slit. The slit has a first side and a second side. The first and second sides are parallel to the first and second side edges of the tube. Removing the strip. Forming a perforation perpendicular to the first and second side edges across an entire width of the tube. Sealing the tube at a first side seam. The first side seam is spaced from and parallel to the perforation. Sealing the tube at a second side seam. The second side seam is spaced from and parallel to the first side seam. Cutting the lower surface at a point below and between the first and second sides of the slit in the upper surface to form two facing bag streams.

(8) In a further variant of the method of making side-seamed plastic produce bags, the method includes the further step of corona treating at least one of the upper surface and the lower surface of the flattened tube prior to slitting the upper surface to remove the strip of plastic material.

(9) In still a further variant of the method, the method includes the further step of printing advertising or informational material on at least one of the corona treated surfaces of the flattened tube.

(10) In yet another variant of the method of making side-seamed plastic produce bags, the method includes the steps of: Extruding a continuous tube of plastic film and flattening the tube. The tube has an upper surface, a lower surface, first and second side edges. Corona treating at least one of the upper surface and the lower surface of the flattened tube. Slitting the upper surface to remove a strip of plastic material to form a slit. The slit has a first side and a second side. The first and second sides are parallel to the first and second side edges of the tube. Removing the strip. Printing either advertising or informational material on at least one of the corona treated surfaces of the flattened tube. Forming a perforation perpendicular to the first and second side edges across an entire width of the tube. Sealing the tube at a first side seam spaced from and parallel to the perforation. Sealing the tube at a second side seam. The second side seam is spaced from and parallel to the first side seam. Winding the tube onto a core for later cutting of the lower surface at a point below and between the first and second sides of the slit in the upper surface to form two facing bag streams.

(11) In still another variant of the method of making side-seamed plastic produce bags, the method includes the steps of: Extruding a continuous tube of plastic film and flattening the tube. The tube has an upper surface, a lower surface, first and second side edges. Corona treating at least one of the upper surface and the lower surface of the flattened tube. Printing either advertising or informational material on at least one of the corona treated surfaces of the flattened tube. Slitting the upper surface to remove a strip of plastic material to form a slit. The slit has a first side and a second side. The first and second sides are parallel to the first and second side edges of the tube. Removing the strip. Forming a perforation perpendicular to the first and second side edges across an entire width of the tube. Sealing the tube at a first side seam spaced from and parallel to the perforation. Sealing the tube at a second side seam. The second side seam is spaced from and parallel to the first side seam. Winding the tube onto a core for later cutting of the lower surface at a point below and between the first and second sides of the slit in the upper surface to form two facing bag streams.

(12) In a further variant of the method, the method includes the further step of rolling each of the bag streams to form a bag roll.

(13) In still a further variant of the method, the method includes the further step of rolling each of the bag streams about a cylindrical core to form a bag roll.

(14) A dispenser for side-seamed plastic produce bags on coreless rolls can be constructed from the following components. A first planar base is provided. A first open topped semi-cylindrical container is provided. The first container has a top end, a bottom end and a vertical slit. The vertical slit extends from the top end to the bottom end. The first container is attached at the bottom end to the first planar base. When a coreless bag roll is inserted into the container from the top end and a leading bag is extended through the vertical slit, bags are continuously dispensable from the first container with the vertical slit serving as a means for parting perforations between bags.

(15) A variation of the dispenser for side-seamed plastic produce bags rolled on cylindrical cores, can be constructed from the following components: A second planar base is provided. A first vertical rod is provided. The first vertical rod has an upper end, a lower end and is sized and shaped to fit slidably within the cores. The first vertical rod is affixed at its lower end to the second planar base. A second open topped semi-cylindrical container is provided. The second container has a top end, a bottom end and a vertical slit, the vertical slit extending from the top end to the bottom end. The second container is attached at the bottom end to the second planar base and located centrally about the first vertical rod. When a bag roll on a cylindrical core is inserted into the second container from the top end with the cylindrical core placed over the first vertical rod and a leading bag is extended through the vertical slit, bags are continuously dispensable from the second container with the vertical slit serving as a means for parting perforations between bags.

(16) A further variation of the dispenser for side-seamed plastic produce bags rolled on cylindrical cores, can be constructed from the following components: A third planar base is provided. A second vertical rod is provided, the second vertical rod has an upper end, a lower end and is sized and shaped to fit slidably within the cores. The second vertical rod is affixed at its lower end to the third planar base. When a bag roll on a cylindrical core is placed over the second vertical rod, bags are continuously dispensable from the roll with the third planar base providing friction for parting perforations between bags.

(17) Still a further variation of the dispenser for side-seamed plastic produce bags rolled on cylindrical cores, can be constructed from the following components: A first horizontal rod is provided. The first horizontal rod is sized and shaped to fit slidably within the cylindrical core. A first dispenser frame is provided. The first dispenser frame includes means for removably maintaining the first horizontal rod at a first pre-determined distance from the first dispenser frame. The first pre-determined distance is greater than one half of a diameter of a roll of the plastic produce bags rolled on cylindrical cores. Means are provided for attaching the first dispensing frame to either a vertical surface or a horizontal surface. When the bag roll on a cylindrical core is suspended on the first horizontal rod, bags are continuously dispensable from the roll.

(18) Yet a further variation of the dispenser for side-seamed plastic produce bags rolled on cylindrical cores, can be constructed from the following components: A second horizontal rod is provided. The second horizontal rod is sized and shaped to fit slidably within the cylindrical core. A second dispenser frame is provided. The second dispenser frame includes means for removably maintaining the second horizontal rod at a first pre-determined distance from the second dispenser frame. The first pre-determined distance is greater than one half of a diameter of a roll of the plastic produce bags rolled on cylindrical cores.

The means for removably maintaining the second horizontal rod at a first pre-determined distance from the second dispenser frame is pivotally mounted so that the produce bags rolled on cylindrical cores pivot downwardly as bags are removed from the roll. Means are provided for attaching the second dispenser frame to either a vertical surface or a horizontal surface. When a bag roll on a cylindrical core is suspended on the second horizontal rod, bags are continuously dispensable from the roll with either a vertical surface or a horizontal surface providing friction for parting perforations between bags.

An appreciation of the other aims and objectives of the present invention and an understanding of it may be achieved by referring to the accompanying drawings and the detailed description of a preferred embodiment.

DESCRIPTION OF THE DRAWINGS

FIG. 1A is a perspective view of a single side seamed produce bag as formed in FIG. 1.

FIG. 3 is a perspective view of a first method of making the invention illustrating the flattening and slitting of the tube, perforating the tube, sealing the bag side edges and cutting the two facing bag streams apart;

FIG. 4 is a perspective view of the FIG. 3 embodiment further illustrating corona treatment and printing of the tube prior to slitting;

FIG. 5 is a perspective view of a coreless roll of the FIG. 1 bags;

FIG. 6 is a perspective view of a cored roll of the FIG. 1 bags;

DETAILED DESCRIPTION OF THE PREFERRED EMBODIMENT (1) FIGS. 1 and 1A illustrate a side-seamed plastic produce bag 10 providing the desired features may be constructed from the following components. A front wall 15 is provided. The front wall 15 has a top edge 20, a bottom edge 25, a first side edge 30, a second side edge 35 and a first predetermined height 40. A back wall 45 is provided. The back wall 45 has an upper edge 50, a lower edge 55, a first side edge 60, a second side edge 65 and a second predetermined height 70 greater than the first predetermined height 40. The front wall 15 and the back wall 45 are formed from a single piece of plastic film 75 such that the bottom edge 25 of the front wall 15 is joined seamlessly with the lower edge 55 of the back wall 45.

Figure 1:
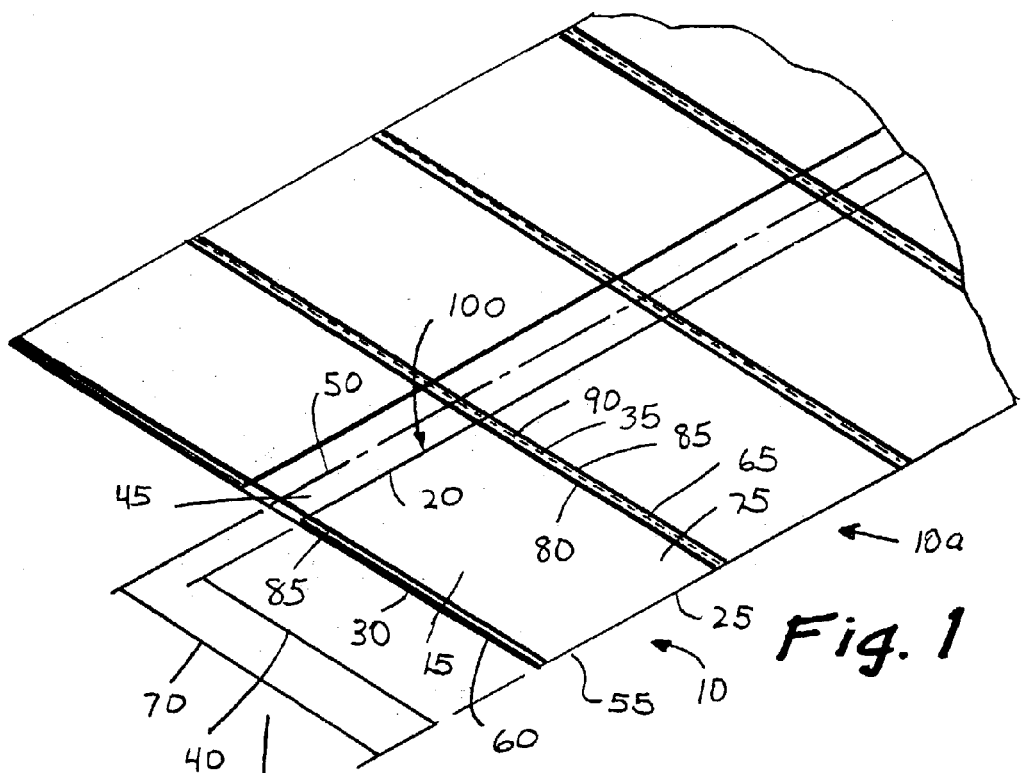
FIG. 1 is a perspective view of the preferred embodiment of the invention illustrating two facing streams of side seamed plastic produce bags attached with perforations.

The first side edge 30 of the front wall 15 is attached to the first side edge 60 of the back wall 45 at a first side seam 80. The second side edge 35 of the front wall 15 is attached to the second side edge 65 of the back wall 45 at a second side seam 85. A perforation 90 is provided. The perforation 95 is spaced from the second side seam 85 and extends from the upper edge 50 of the back wall 45 to the lower edge 55 of the back wall 45. The perforation 90 joins the bag 10 to a subsequent bag 10a. When separated from the subsequent bag 10a, the bag 10 will have a back wall 45 of greater height than the front wall 15, thereby providing a means for locating an opening 100 of the bag 10.

Figure 2:
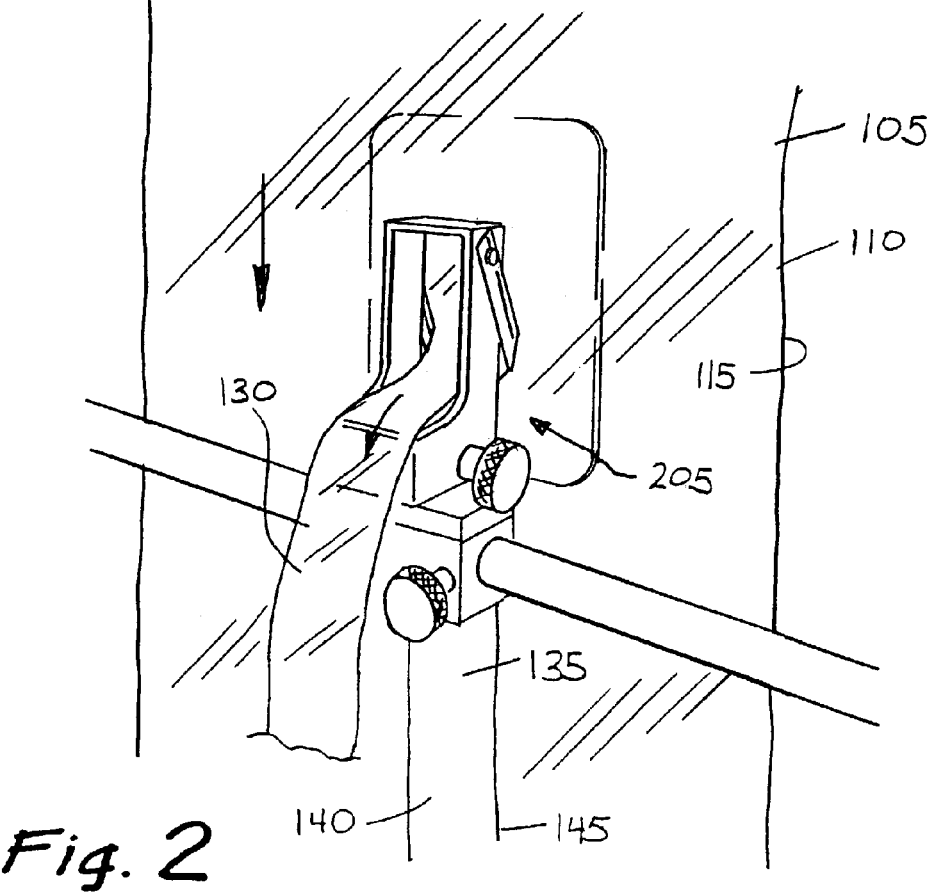
FIG. 2 is a detailed perspective view of a plastic film slitting mechanism removing a central strip from the tube.

(2) A method of making side-seamed plastic produce bags 10, as illustrated in FIGS. 2 and 3, comprises the steps of: extruding a continuous tube 105 of plastic film 75 and flattening the tube 105. The tube 105 has an upper surface 110, a lower surface 115, first 120 and second 125 side edges. Slitting the upper surface 110 to remove a strip of plastic material 130 to form a slit 135. The slit 135 has a first side 140 and a second side 145. The first 140 and second 145 sides are parallel to the first 120 and second 125 side edges of the tube 105. Removing the strip 130. Forming a perforation 90 perpendicular to the first 120 and second 125 side edges across an entire width 150 of the tube 105. Sealing the tube 105 at a first side seam 80. The first side seam 80 is spaced from and parallel to the perforation 90. Sealing the tube 105 at a second side seam 85. The second side seam 85 is spaced from and parallel to the first side seam 80. Cutting the lower surface 115 at a point 155 below and between the first 140 and second 145 sides of the slit 135 in the upper surface 110 to form two facing bag streams 160, 165.

(3) In a variant of the method of making side-seamed plastic produce bags 10, as illustrated in FIG. 4, the method includes the further step of corona treating 170 at least one of the upper surface 110 and the lower 115 surface of the flattened tube 105 prior to slitting the upper surface 110 to remove the strip of plastic material 130.

(4) In a further variant of the method, also illustrated in FIG. 4, the method includes the further step of printing advertising or informational material 175 on at least one of the corona treated 170 surfaces 110, 115 of the flattened tube 105.

(5) In still a further variant of the method, as illustrated in FIGS. 4 and 5, the method includes the further step of rolling each of the bag streams 160, 165 to form a bag roll 180.

(6) In yet a further variant of the method, as illustrated in FIG. 6, the method includes the further step of rolling each of the bag streams 160, 165 about a cylindrical core 185 to form a bag roll 190.

Figure 7:
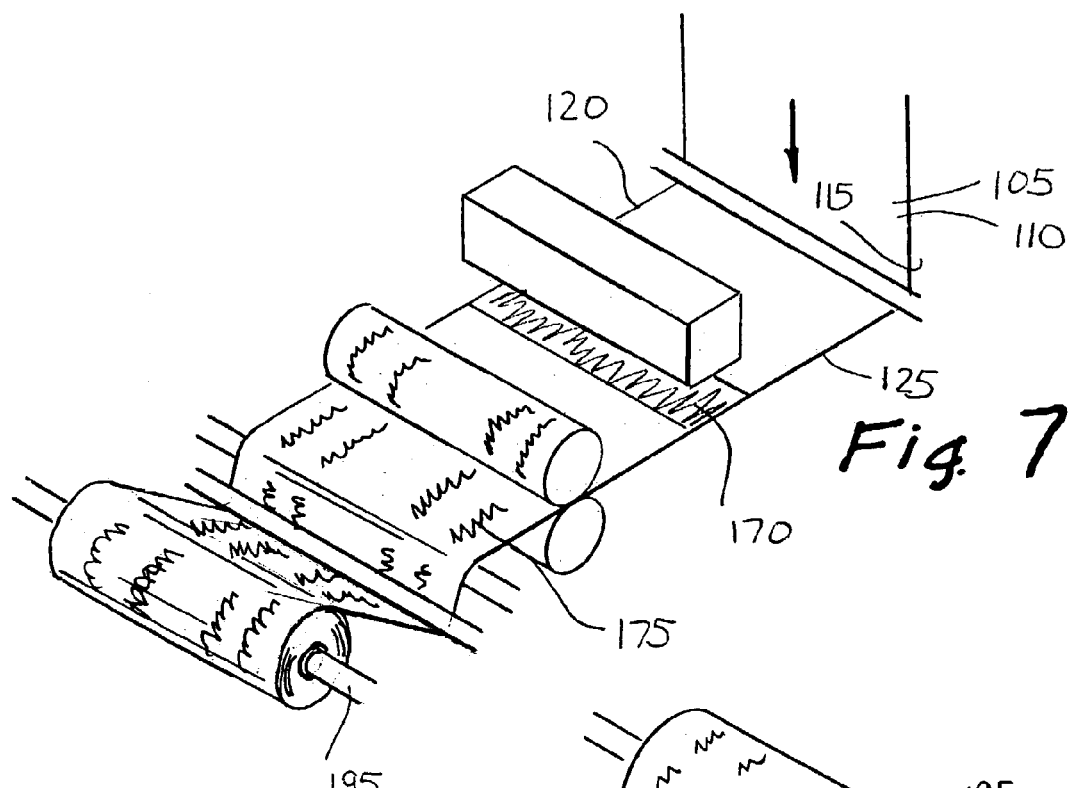
FIG. 7 is a perspective view of a process for corona treating and printing a flattened plastic tube and rolling same onto a core for later processing.
Figure 8:
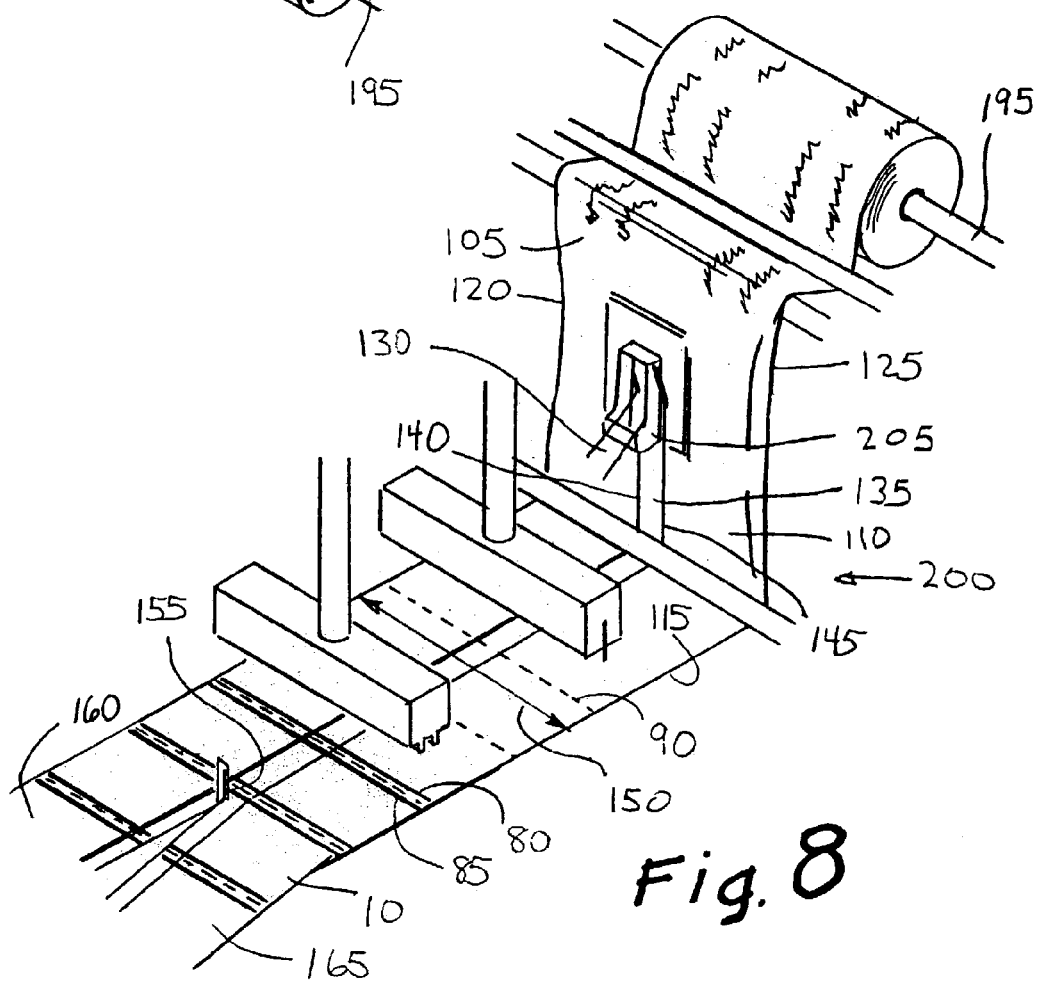
FIG. 8 is a perspective view of a second portion of the FIG. 7 process in which the printed tube is slit, perforated, sealed and cut into two facing bag streams.

(7) In another variant of the method of making side-seamed plastic produce bags 10, as illustrated in FIGS. 7 and 8, the method includes the steps of: Extruding a continuous tube 105 of plastic film 75 and flattening the tube 105. The tube 105 has an upper surface 110, a lower surface 115, first 120 and second 125 side edges. Winding the flattened tube 105 onto a core 195. Moving the core 195 to a cutting machine 200. The cutting machine 200 includes a slitter 205. Feeding the tube 105 from the core 195 into the cutting machine 200. Slitting the upper surface 110 to remove a strip of plastic material 130 and form a slit 135. The slit 135 has a first side 140 and a second side 145. The first 140 and second 145 sides are parallel to the first 120 and second 125 side edges of the tube 105. Removing the strip 130. Forming a perforation 90 perpendicular to the first 120 and second 125 side edges across an entire width 150 of the tube 105. Sealing the tube 105 at a first side seam 80. The first side seam 80 is spaced from and parallel to the perforation 90. Sealing the tube 105 at a second side seam 85. The second side seam 85 is spaced from and parallel to the first side seam 80. Cutting the lower surface 115 at a point 155 below and between the first 140 and second 145 sides of the slit 135 in the upper surface 110 to form two facing bag streams 160, 165.

(8) In a further variant of the method of making side-seamed plastic produce bags 10, also illustrated in FIG. 7, the method includes the further step of corona treating 170 at least one of the upper surface 110 and the lower surface 115 of the flattened tube 105 prior to slitting the upper surface 110 to remove the strip of plastic material 130.

(9) In still a further variant of the method, also illustrated in FIG. 7, the method includes the further step of printing advertising or informational material 175 on at least one of the corona treated 170 surfaces 110, 115 of the flattened tube 105.

Figure 9:
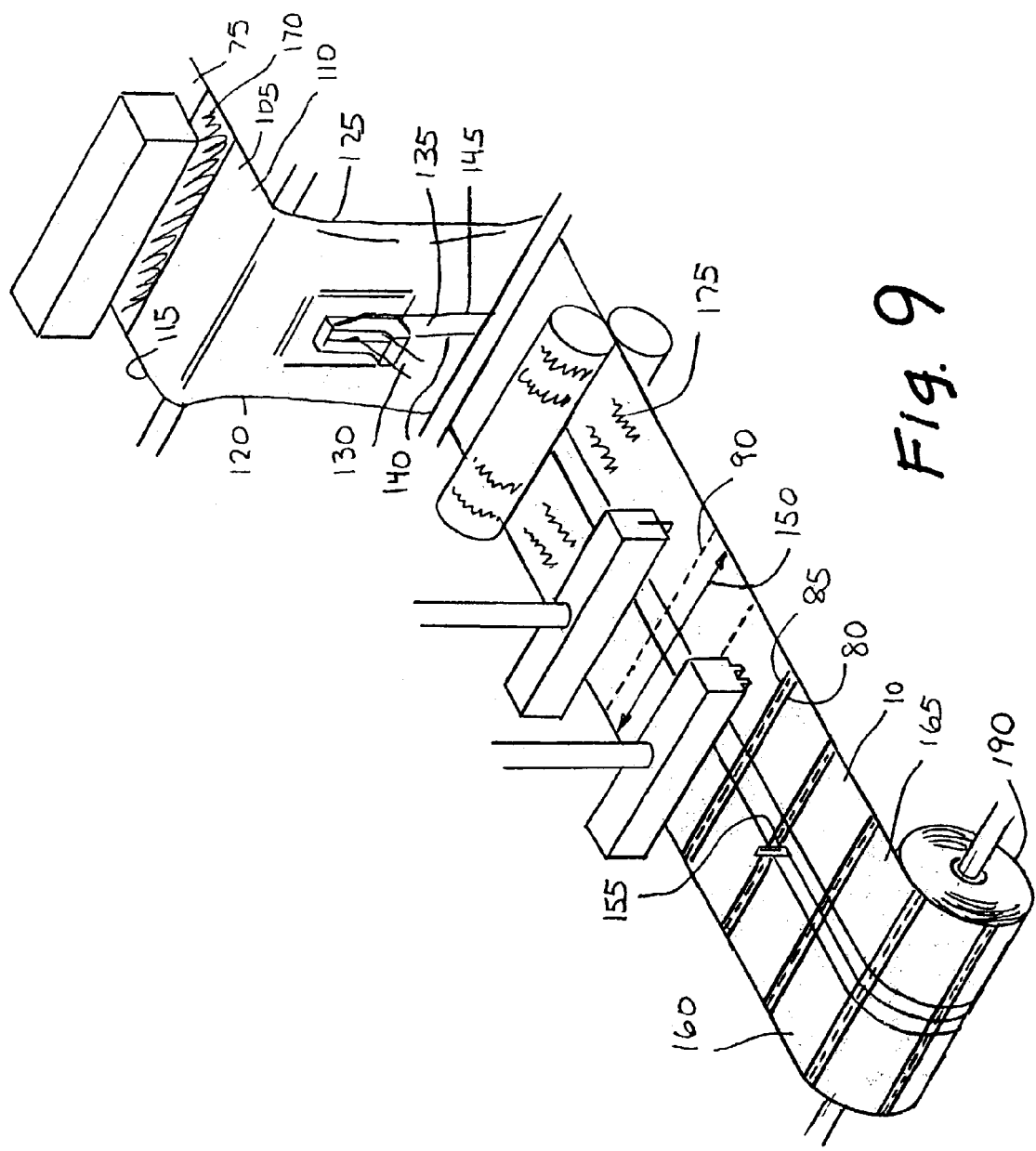
FIG. 9 is a perspective view of another method of making the FIG. 1 bags by corona treating, slitting, printing, perforating and sealing the tube and winding the tube onto a core for later separation into two facing bag streams.

(10) In yet another variant of the method of making side-seamed plastic produce bags 10, as illustrated in FIG. 9, the method includes the steps of: Extruding a continuous tube 105 of plastic film 75 and flattening the tube 105. The tube 105 has an upper surface 110, a lower surface 115, first 120 and second 125 side edges. Corona treating 170 at least one of the upper surface 110 and the lower surface 115 of the flattened tube 105. Slitting the upper surface 110 to remove a strip of plastic material 130 to form a slit 135. The slit 135 has a first side 140 and a second side 145. The first 140 and second 145 sides are parallel to the first 120 and second 125 side edges of the tube 105. Removing the strip 130. Printing either advertising or informational material 175 on at least one of the corona treated 170 surfaces 110, 115 of the flattened tube 105. Forming a perforation 90 perpendicular to the first 120 and second 125 side edges across an entire width 150 of the tube 105. Sealing the tube 105 at a first side seam 80 spaced from and parallel to the perforation 90. Sealing the tube 105 at a second side seam 85. The second side seam 85 is spaced from and parallel to the first side seam 80. Cutting the lower surface 115 at a point 155 below and between the first 140 and second 145 sides of the slit 135 in the upper surface 110 to form two facing bag streams 160, 165.

Figure 10:
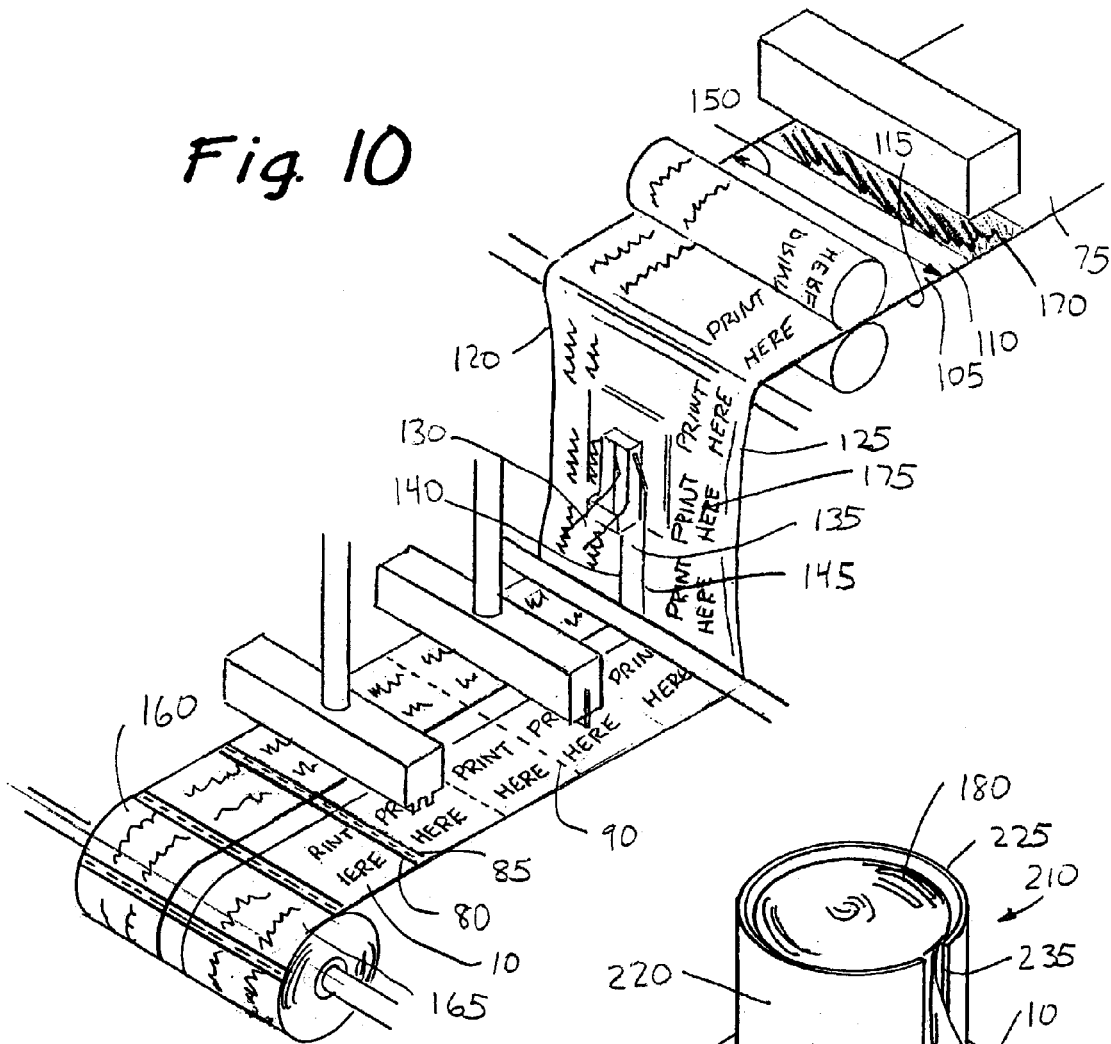
FIG. 10 is a perspective view of still another method of making the FIG. 1 bags by corona treating, printing, slitting, perforating and sealing the tube and winding the tube onto a core for later separation into two facing bag streams.

(11) In still another variant of the method of making side-seamed plastic produce bags 10, as illustrated in FIG. 10, the method includes the steps of: Extruding a continuous tube 105 of plastic film 75 and flattening the tube 105. The tube 105 has an upper surface 110, a lower surface 115, first 120 and second 125 side edges. Corona treating 170 at least one of the upper surface 110 and the lower surface 115 of the flattened tube 105. Printing either advertising or informational material 175 on at least one of the corona treated 170 surfaces 110, 115 of the flattened tube 105. Slitting the upper surface 110 to remove a strip of plastic material 130 to form a slit 135. The slit 135 has a first side 140 and a second side 145. The first 140 and second 145 sides are parallel to the first 120 and second 125 side edges of the tube 105. Removing the strip 130. Forming a perforation 90 perpendicular to the first 120 and second 125 side edges across an entire width 150 of the tube 105. Sealing the tube 105 at a first side seam 80 spaced from and parallel to the perforation 90. Sealing the tube 105 at a second side seam 85. The second side seam 85 is spaced from and parallel to the first side seam 80. Winding the tube 105 onto a core 185 for later cutting of the lower surface 115 at a point 155 below and between the first 140 and second 145 sides of the slit 135 in the upper surface 110 to form two facing bag streams 160, 165.

(12) In a further variant of the method, as illustrated in FIG. 5, the method includes the further step of rolling each of the bag streams 160, 165 to form a bag roll 180.

(13) In still a further variant of the method, as illustrated in FIGS. 5, 6 and 9, the method includes the further step of rolling each of the bag streams 160, 165 about a cylindrical core 185 to form a bag roll 190.

Figure 11:
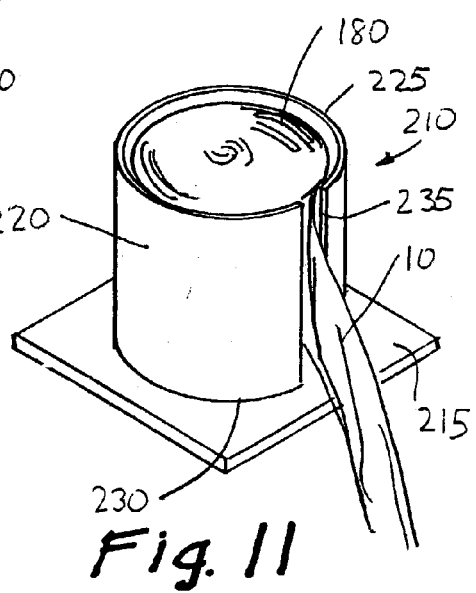
FIG. 11 is a perspective view of a vertical dispenser for side seamed plastic produce bags on coreless rolls.

(14) A dispenser 210, as illustrated in FIG. 11, for side-seamed plastic produce bags 10 on coreless rolls 180 can be constructed from the following components. A first planar base 215 is provided. A first open topped semi-cylindrical container 220 is provided. The first container 220 has a top end 225, a bottom end 230 and a vertical slit 235. The vertical slit 235 extends from the top end 225 to the bottom end 230. The first container 220 is attached at the bottom end 230 to the planar base 215. When a coreless bag roll 180 is inserted into the first container 220 from the top end 225 and a leading bag 10 is extended through the vertical slit 235, bags 10 are continuously dispensable from the first container 220 with the vertical slit 235 serving as a means for parting perforations 90 between bags 10.

Figure 12:
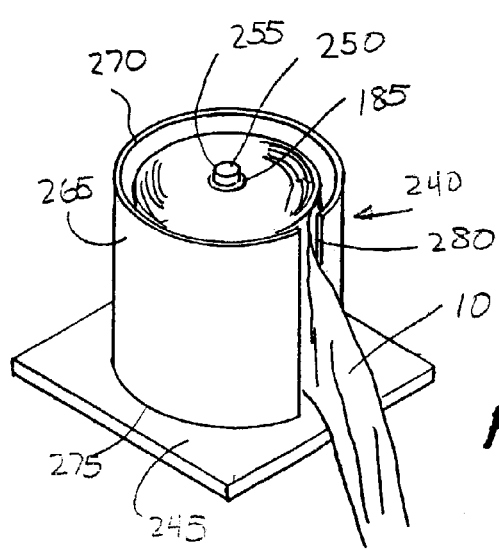
FIG. 12 is a perspective view of a vertical dispenser for side seamed plastic produce bags on cored rolls.

(15) A dispenser 240, as illustrated in FIG. 12 for side-seamed plastic produce bags 10 rolled on cylindrical cores 185, can be constructed from the following components: A second planar base 245 is provided. A first vertical rod 250 is provided. The first vertical rod 250 has an upper end 255, a lower end (not shown) and is sized and shaped to fit slidably within the cores 185. The first vertical rod 250 is affixed at its lower end to the second planar base 245. A second open topped semi-cylindrical container 265 is provided. The second container 265 has a top end 270, a bottom end 275 and a vertical slit 280, the vertical slit 280 extending from the top end 270 to the bottom end 275. The second container 265 is attached at the bottom end 275 to the second planar base 245 and located centrally about the first vertical rod 250. When a bag roll 190 on a cylindrical core 185 is inserted into the second container 265 from the top end 270 with the cylindrical core 185 placed over the first vertical rod 250 and a leading bag 10 is extended through the vertical slit 280, bags 10 are continuously dispensable from the second container 265 with the vertical slit 280 serving as a means for parting perforations 90 between bags 10.

Figure 13:
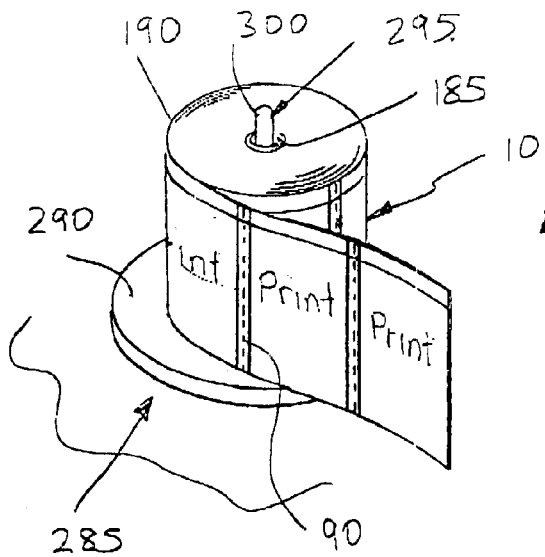
FIG. 13 is a perspective view of an alternative vertical dispenser for side seamed plastic produce bags on cored rolls.

(16) A dispenser 285, as illustrated in FIG. 13, for side-seamed plastic produce bags 10 rolled on cylindrical cores 185, can be constructed from the following components: A third planar base 290 is provided. A second vertical rod 295 is provided. The second vertical rod 295 has an upper end 300, a lower end (not shown) and is sized and shaped to fit slidably within the cores 185. The second vertical rod 295 is affixed at its lower end to the third planar base 290. When a bag roll 190 on a cylindrical core 185 is placed over the second vertical rod 295, bags 10 are continuously dispensable from the roll 190 with the third planar base 290 providing friction for parting perforations 90 between bags 10.

Figure 14:
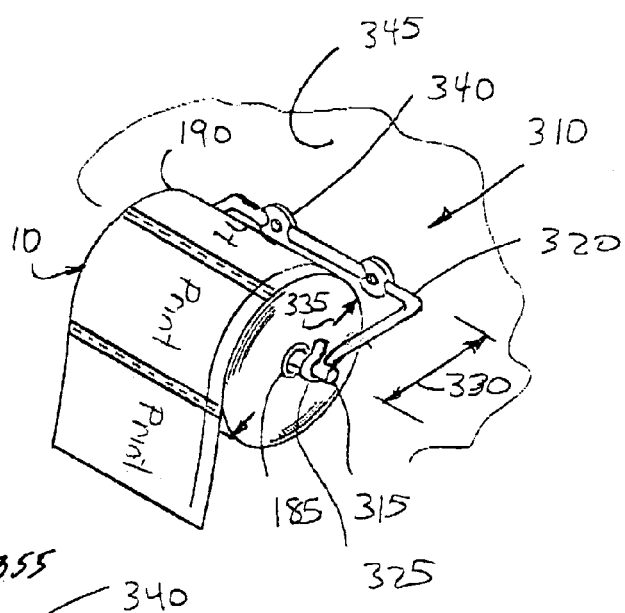
FIG. 14 is a perspective view of a horizontal dispenser for side seamed plastic produce bags on cored rolls.

(17) A dispenser 310, as illustrated in FIG. 14, for side-seamed plastic produce bags 10 rolled on cylindrical cores 185, can be constructed from the following components: A first horizontal rod 315 is provided. The first horizontal rod 315 is sized and shaped to fit slidably within the cylindrical core 185. A first dispenser frame 320 is provided. The first dispenser frame 320 includes means 325 for removably maintaining the first horizontal rod 315 at a first pre-determined distance 330 from the first dispenser frame 320. The first pre-determined distance 330 is greater than one half of a diameter 335 of a roll 190 of the plastic produce bags 10 rolled on cylindrical cores 185. Means 340 are provided for attaching the first dispensing frame 320 to either a vertical surface 345 or a horizontal surface (not shown). When the bag roll 190 on a cylindrical core 185 is suspended on the first horizontal rod 315, bags 10 are continuously dispensable from the roll 190.

Figure 15:
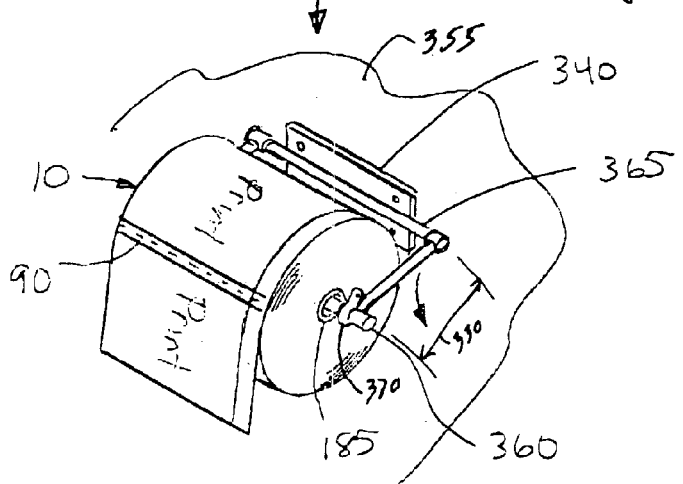
FIG. 15 is a perspective view of an alternative horizontal dispenser for side seamed plastic produce bags on cored rolls.

(18) A dispenser 355, as illustrated in FIG. 15, for side-seamed plastic produce bags 10 rolled on cylindrical cores 185, can be constructed from the following components: A second horizontal rod 360 is provided. The second horizontal rod 360 is sized and shaped to fit slidably within the cylindrical core 185. A second dispenser frame 365 is provided. The second dispenser frame 365 includes means 370 for removably maintaining the second horizontal rod 360 at a first pre-determined distance 330 from the second dispenser frame 365. The first pre-determined distance 330 is greater than one half of a diameter 335 of a roll 190 of the plastic produce bags 10 rolled on cylindrical cores 185.

The means 370 for removably maintaining the second horizontal rod 360 at a first pre-determined distance 330 from the second dispenser frame 365 are pivotally mounted so that the produce bags 10 rolled on cylindrical cores 185 pivot downwardly as bags 10 are removed from the roll 190. Means 340 are provided for attaching the second dispenser frame 365 to either a vertical surface (not shown) or a horizontal surface 350. When a bag roll 190 on a cylindrical core 185 is suspended on the second horizontal rod 360, bags 10 are continuously dispensable from the roll 190 with either a vertical surface 345 or a horizontal surface 350 providing friction for parting perforations 90 between bags 10.

The side seamed produce bag 10, methods for making and dispensers 210, 240, 285, 310, 355 for same have been described with reference to particular embodiments. Other modifications and enhancements can be made without departing from the spirit and scope of the claims that follow.

The invention claimed is:

1. A method of making side-seamed plastic produce bags, comprising the steps of:
   extruding a continuous tube of plastic film;
   flattening said tube, said tube having an upper surface, a lower surface, first and second side edges;
   slitting said upper surface to remove a strip of plastic material to form a slit, said slit having a first side and a second side, said first and second sides being parallel to said first and second side edges of said tube;
   removing said strip;
   forming a perforation perpendicular to said first and second side edges across an entire width of said tube;
   sealing said tube at a first side seam spaced from and parallel to said perforation;
   sealing said tube at a second side seam, said second side seam being spaced from and parallel to said first side seam;
   cutting said lower surface at a point below and between said first and second sides of said slit in said upper surface to form two facing bag streams.

2. A method of making side-seamed plastic produce bags as described in claim 1, further comprising the step of corona treating at least one of said upper surface and said lower surface of said flattened tube prior to slitting said upper surface to remove said strip of plastic material.

3. A method of making side-seamed plastic produce bags as described in claim 2, further comprising the step of printing either of advertising and informational material on at least one of said corona treated surfaces of said flattened tube.

4. A method of making side-seamed plastic produce bags as described in claims 1, 2 or 3, further comprising the step of rolling each of said bag streams to form a bag roll.

5. A method of making side-seamed plastic produce bags as described in claims 1, 2 or 3, further comprising the step of rolling each of said bag streams about a cylindrical core to form a bag roll.

6. A method of making side-seamed plastic produce bags, comprising the steps of:
   extruding a continuous tube of plastic film;
   flattening said tube, said tube having an upper surface, a lower surface, first and second side edges;
   winding said flattened tube onto a core;
   moving said core to a cutting machine, said cutting machine including a slitter;
   feeding said tube from said core into said cutting machine;
   slitting said upper surface to remove a strip of plastic material to form a slit, said slit having a first side and a second side, said first and second sides being parallel to said first and second side edges of said tube;
   removing said strip;
   forming a perforation perpendicular to said first and second side edges across an entire width of said tube;
   sealing said tube at a first side seam spaced from and parallel to said perforation;
   sealing said tube at a second side seam, said second side seam being spaced from and parallel to said first side seam;
   cutting said lower surface at a point below and between said first and second sides of said slit in said upper surface to form two facing bag streams.

7. A method of making side-seamed plastic produce bags as described in claim 6, further comprising the step of corona treating at least one of said upper surface and said lower surface of said flattened tube prior to slitting said upper surface to remove said strip of plastic material.

8. A method of making side-seamed plastic produce bags as described in claim 7, further comprising the step of printing either of advertising and informational material on at least one of said corona treated surfaces of said flattened tube.

9. A method of making side-seamed plastic produce bags as described in claims 6, 7, or 8, further comprising the step of rolling each of said bag streams to form a bag roll.

10. A method of making side-seamed plastic produce bags as described in claims 6, 7, or 8, further comprising the step of rolling each of said bag streams about a cylindrical core to form a bag roll.

* * * * *